Figure 1:
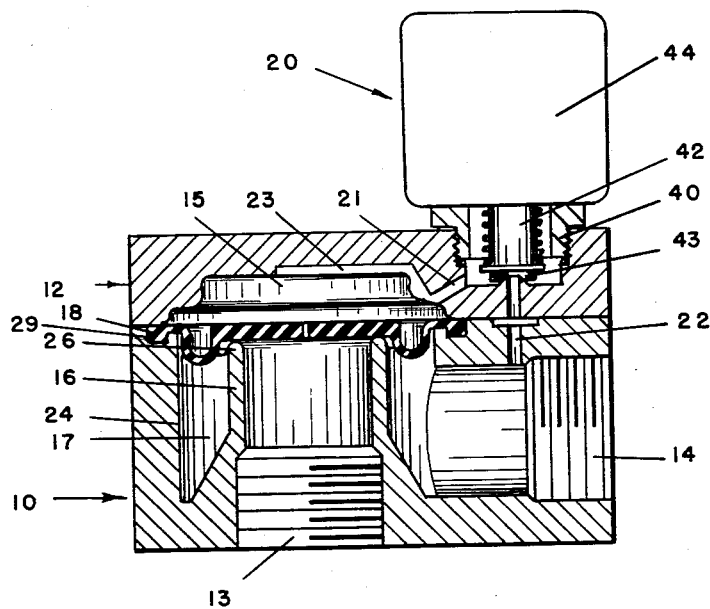

Feb. 20, 1962  I. C. CONE ETAL  3,022,039
DIAPHRAGM FOR VALVE
Filed Dec. 22, 1958

INVENTORS
IRWIN C. CONE
GEORGE H. JENKINS, III
BY
ATTORNEY

൹nited States Patent Office 3,022,039
Patented Feb. 20, 1962

3,022,039
DIAPHRAGM FOR VALVE
Irwin C. Cone, Littleton, and George H. Jenkins III, Denver, Colo., assignors to The Gates Rubber Company, Denver, Colo., a corporation of Colorado
Filed Dec. 22, 1958, Ser. No. 782,251
4 Claims. (Cl. 251—46)

This invention relates to a new and improved diaphragm construction in a valve for use in hydraulic flow systems and has more particular relation to a valve of the diaphragm type which is adapted for remote control regulation of water or fluid flow.

In the design of remote control valve systems important considerations include handling of large volumes of water at a low loss and opening and closing the valve with minimum hammer or vibration of the closure member. For example, it is customary to employ in such valves as a closure member a flexible diaphragm which by pilot control may be urged to move into and out of engagement with a valve seat portion disposed between the inlet and outlet port in the valve, and in this connection, the valve may be so designed that the diaphragm is urged to a closed position against the valve seat by acting either against or with the inlet line pressure. Normally it would be expected that the diaphragm, especially when closing against line pressure, would close very slowly due to the overall pressure increase as the water flow is being stopped by the movement of the diaphragm, thus slowing the rate of closure and keeping the action free of water hammer. However, it has been found that, in closing, due to the increase in rate of water flow across the valve seat as the diaphragm approaches the closed position, a low pressure area is produced at this point tending to snap the diaphragm into place on the seat so as to produce hammering and noise, and in many cases vibration and chattering in the water pipes.

In accordance with the present invention it is proposed to eliminate water hammer and vibration in opening and closing the valve, notwithstanding the fact that the valve is remotely controlled or pilot-operated and that the movement of the diaphragm or closure member itself is not directly or manually controlled. In addition, it is proposed to accomplish such in a way, if desired, as to make the diaphragm member itself conformable for incorporation into various different types of valve members to effectively control the opening and closing action in the valve. Accordingly, the valve unit as a whole may be simply but effectively designed and constructed to achieve the desired characteristics, and merely by controlling the design of the diaphragm itself the associate problems of water hammer and chattering of the valve and associate pipes may be eliminated.

Accordingly, it is a primary object of the present invention to provide in a diaphragm valve a way of controlling the rate of opening and closing of the diaphragm against the valve seat wherein the valve unit itself is made extremely simple, compact and inexpensive in construction and may be operated by remote control with minimum water loss and noise as the valve is being opened and closed.

It is another object to provide in a diaphragm valve a way of controlling the opening and closing of the diaphragm against the valve seat by regulation of the reduction in flow of fluid between the diaphragm and seat so as to eliminate hammer and vibration.

It is a further object to produce a diaphragm valve in which provision is made for controlling the rate of movement between the diaphragm and valve seat in opening and closing by regulation of the rate and location of change of pressure of the fluid flowing between the diaphragm and the valve seat.

It is a still further object to provide in a diaphragm valve means disposed adjacent the seat contacting surface of the diaphragm which is so constructed and arranged as to establish a gradual increase and reduction in liquid flow between the diaphragm and the valve seat in opening and closing respectively.

Figure 2:
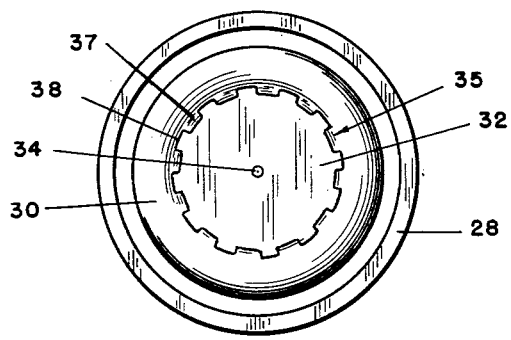

The above and other objects and advantages of the present invention will become more apparent from the following detailed description taken together with the accompanying drawings in which:

FIGURE 1 is a vertical section view taken through the center of a pilot-operated, diaphragm type valve in accordance with the present invention; and FIGURE 2 is a bottom view of a preferred form of diaphragm in accordance with the present invention.

Referring more particularly to the drawings, there is shown by way of illustrative example in FIGURE 1 a valve including a body 10 and a cover 12 fastened together to provide therein an inlet port 13, an outlet port 14, and an upper chamber 15. As shown, a tubular extension 16 of the inlet port 13 serves to divide the inlet 13 from an outer concentric recess 17 forming part of the outlet section, and a diaphragm member 18 is disposed transversely across the inlet port 13 and recess 17 just above the extension 16 for controlling the flow of water from the inlet into the outlet port. To regulate the opening and closing of the diaphragm 18 a pilot section 20 is provided which includes an inlet line 21 communicating with the upper chamber 15 and a bleeder or exhaust line 22 communicating with the outlet port 14.

As shown, the upper chamber 15 is of generally inverted, dish-shaped configuration and is provided with an irregular cavity 23 in the upper surface thereof so that the pilot section 21 will be in direct communication with a relatively large surface area of the diaphragm 18 when the diaphragm is moved to its upward flexed position against the wall of the chamber. Also, it will be noted that the upper chamber 15 is of an outer diameter slightly greater than the annular recess 17 so as to provide a greater exposed surface area on the upper surface of the diaphragm than the lower surface of the diaphragm which is defined by outer wall 24 of the annular recess. In this way, it will be evident that water pressure acting on the upper surface of the diaphragm may exert a greater force than the force acting upwardly on the inner surface of the diaphragm. In turn, the tubular extension 16 verges upwardly from the lower wall of the valve body and at the upper end thereof forms a generally cylindrical portion having a rounded rim defining a valve seat 26 for engaging the undersurface of the diaphragm. Of course the relative proportions established between the inlet and outlet will be governed by the relative sizes of the ducts or pipes into which the respective ports are connected, although it is desirable to make the outlet volume as great or greater than the inlet volume in order to permit even flow of water through the valve with little or no restriction.

A primary feature of the present invention is the diaphragm 18 which forms a flexible closure member adapted to interrupt the flow of water between the inlet and outlet in its downwardly disposed position against the valve seat 26, or to permit the full unrestricted flow of water between the inlet and outlet when the diaphragm is in an upwardly flexed position against the upper wall of the chamber 15. To this end, the diaphragm is of a generally circular configuration having an enlarged outer rim 28 for disposition in a groove 29 provided in the upper surface of the valve body together with a circular fold 30 and a flat intermediate seat-contacting portion 32 forming the central part of the diaphragm. Also provided in the center of the diaphragm is a bleeder passage 34 which, in a well-known manner, may be utilized in controlling the pressure differential between opposite surfaces of the diaphragm. To hold the diaphragm securely in place within the valve the rim 28 is held within the annular groove 29 by the cover surface which may be fastened by means of suitable bolts or screws to the valve body. The circular fold 30 conforms generally to the size and shape of the annular recess 17 so as to bend downwardly into the recess when the diaphragm is in a closed position and to permit the desired upward displacement of the diaphragm into the open position against the top surface of the chamber 15. The flat intermediate portion 32 is made relatively inflexible in order to provide the desired uniform seal against the valve seat when the diaphragm is moved to the closed position. It will also be noted that in the closed position the diaphragm of the present invention is provided with a notched ridge or shoulder 35 portion which in the preferred form comprises a fillet projecting inwardly from the innermost point of the circular fold 30 and downwardly from the outer periphery of the intermediate portion 32 so as to form a series of ribs 37 for engaging the outer wall of the valve seat adjacent to the rim 26. Preferably the ribs 37 are straight sided and of a size substantially equal to alternating notches or recesses 38 so that as the shoulder portion 35 engages the outer wall of the valve seat an alternating series of evenly spaced openings are provided so as to gradually throttle or reduce the flow of water over the rim 26 as the diaphragm moves into closed position.

To accommodate the pilot section 20 the cover 12 of the valve is provided with an enlarged counterbored portion 40 through which there is extended a spring loaded plunger or armature 42 provided with a rubber tip 43 which may be moved into sealed engagement with the upper edge of the bleeder line 22. The spring-loaded plunger 42 may be made to operate by means of a solenoid 44 which upon energization will draw the plunger upwardly against the force of the spring so as to open the bleeder line 22 and permit communication between the upper chamber and outlet 14.

As water enters the valve through the inlet 13 the bleeder passage 34 in the diaphragm will of course admit the water slowly into the upper chamber 15 and with the solenoid in a closed, de-energized position the water will gradually build up pressure in the upper chamber, and due to the increased surface area on the top of the diaphragm 18 will gradually overcome the force acting upwardly to keep the diaphragm forced down against the valve seat. When the solenoid is actuated, the plunger 42 will of course move upwardly to permit water in the upper chamber to drain off through the pilot chamber into the outlet port. In this manner, the line pressure at the inlet will force the diaphragm upwardly so as to permit full flow operation. Conversely, when the solenoid is deenergized this spring-loaded plunger will close the bleed line 22, and once again pressure will build up in the upper chamber 15 forcing the diaphragm closed against the line pressure.

Notwithstanding the fact that the diaphragm is being urged to a closed position against the line pressure and that the pilot section is not directly connected with the diaphragm so as to make the diaphragm as light as possible, nevertheless water hammer and vibration of the diaphragm both in opening and closing are encountered in the absence of means to control the reduction in flow and pressure of the water between the valve seat and diaphragm. For example, without the notched shoulder portion 35 it will be noted that as the diaphragm approaches the rim 26 the velocity of water flow across the seat portion will be greatly increased due to the restricted passage formed by the diaphragm. Thus, the water pressure will be greatly reduced and to an extent such that a sudden increase in differential pressure is developed between the top surface of the diaphragm and undersurface adjacent the valve seat, tending to slam the diaphragm against the valve seat. To obviate this, the notched shoulder portion is so proportioned as to engage the outer wall of the valve seat as the diaphragm approaches the seat to reduce the flow of water between the inlet and outlet at a point removed from the restricted opening formed between the intermediate seat-contacting surface 32 of the diaphragm and the valve seat 24. By thus reducing the flow of water at a point removed from the seat-contacting surface it is suspected that the flow velocity between the rim and diaphragm is considerably reduced so as to counteract the tendency of the flow velocity to increase suddenly as the diaphragm moves toward the valve seat; thus, the pressure is not suddenly and correspondingly decreased at this point and the diaphragm will not slam against the seat from a sudden reduction in pressure. Water flow ultimately ceases as the flat part of the diaphragm seats against the top of the valve seat since, of course, the downward force imposed on the diaphragm is gradually increasing as the upper chamber fills up. Again, in opening, the notched shoulder portion 35 will throttle the flow of water so as to reduce the increase in water flow across the valve seat in relation to the rate of upward movement of the diaphragm. In this way, the rate of pressure and velocity change of the water flowing between the diaphragm and valve seat is minimized until the passage formed between the diaphragm and valve seat is substantially increased. This manner of controlling the opening has been found effective in enabling smoother opening movement of the diaphragm and preventing any possible vibration or chatter of the diaphragm due to sudden pressure changes and turbulence of the water as the diaphragm initially moves away from the valve seat.

While any number or shape of notches will aid in controlling reduction of pressure adjacent the seat-contacting surface, it has been found preferable to equally space the notches and to make them of a size corresponding to the size of the alternating ribs. Also, rectangular shaped notches have been found to be most effective to control the gradual reduction in flow although it will be evident that the notch configuration may be substantially modified to obtain the desired results, for example, V-shaped, convex or concave notches may be formed in such a way as to effectively throttle the flow of water at a point removed from the area of engagement between the seat-contacting surface of the diaphragm and the valve seat itself. Moreover, it will be evident that the notched ridge may be projected downwardly from the diaphragm to engage the inner wall of the valve seat rather than the outer wall so as to effectively throttle the flow of water before passing across the top of the valve seat, and in this way, again effectively prevent undue reduction in pressure across the valve seat.

Although the diaphragm of the present invention has been found to be especially effective in the control of water hammer where the diaphragm is urged to close against line pressure, it will be evident that the diaphragm construction would also be effective in preventing water hammer where constructed and employed to close with line pressure. Further, in this connection, the diaphragm itself may be of various configurations and shapes depending upon the arrangement of inlet and outlet ports, it being essential only that the notched rim is so constructed and arranged as to engage the wall of the valve seat in opening and closing so as to throttle the flow of water at a point removed from the top of the seat so as to prevent undue pressure reduction at this point.

Accordingly, it will be apparent from the foregoing that various changes and modifications in the construction and configuration of the diaphragm and the valve may be made without departing from the spirit of the present invention, as defined by the appended claims.

We claim:

1. A diaphragm for a valve adapted to move into and out of engagement with a cylindrical valve seat located to divide concentric inlet and outlet openings within a valve body, said diaphragm comprising a rim for securing said diaphragm within said valve body transversely across said valve seat, a circular fold, an intermediate valve seat-contacting portion to regulate the opening and closing of the valve, and a circumferential ridge including spaced recessed portions extending substantially the full depth of said ridge, said ridge extending inwardly from the inner periphery of said fold and being circumferentially bounded by said fold, said ridge thereby engaging the outer wall of said valve seat to gradually reduce the flow of water between the inlet and outlet at a location removed from the opening between the seat and diaphragm when said diaphragm moves into and out of engagement with said valve seat.

2. A resilient diaphragm for controlling the opening and closing of a diaphragm valve, comprising a rim, a generally flat intermediate portion for engaging a valve seat in the valve, a circular fold surrounding said intermediate portion being proportioned to lie in spaced outer concentric relation with respect to the outer surface of the valve seat, and a circumferential shoulder tapering downwardly from said intermediate portion along the inner periphery of said fold to contact the wall of said valve seat, said shoulder being defined of an alternating series of generally rectangular ribs and notches evenly spaced around said shoulder and being circumferentially bounded by said circular fold so as to throttle the flow of water passing between said seat and said diaphragm in opening and closing.

3. In a pilot operated flow control valve having a body defining a chamber and concentrically arranged inlet and outlet conduits separated by a cylindrical valve seat terminating adjacent said chamber, pilot means including a pilot intake and exhaust operable to control the flow of liquid from said chamber therethrough into said outlet, the combination of a resilient, reinforced diaphragm extending across said inlet and outlets conduits so as to partition said conduits from said chamber, said diaphragm having a circular fold extending into said outlet conduit, a flat intermediate portion normally biased against the end of said wall provided with an aperture extending therethrough for liquid flow from said inlet into said chamber, said diaphragm being movable into said chamber upon opening said pilot means to allow unrestricted flow from said inlet into said outlet and further movable upon instantaneous closing of said pilot means to return to a closed position against the flow of liquid through said inlet and over the rim thereof, and a circumferentially extending flexible ridge tapering downwardly from said intermediate portion adjacent said fold, said ridge being circumferentially bounded by said circular fold and including rectangular notched portions at spaced intervals therealong to throttle the flow of water between said diaphragm and said valve seat in opening and closing.

4. A diaphragm for a valve adapted to move into and out of engagement with a cylindrical valve seat located to divide concentric inlet and outlet openings within a valve body said diaphragm comprising: a rim for securing said diaphragm within said valve body transversely across said valve seat, a circular fold, a circumferential ridge extending inwardly from the inner periphery of said fold and supported by said fold with recessed portions formed at spaced intervals along said ridge and extending the full depth thereof, said ridge being circumferentially bounded by said circular fold to gradually reduce the flow of water between the inlet and outlet at a location removed from the opening between the seat and diaphragm as said diaphragm moves toward and away from the valve seat.

References Cited in the file of this patent

UNITED STATES PATENTS

| | | |
|---|---|---|
| 1,004,650 | Hilton | Oct. 3, 1911 |
| 2,433,507 | Delany | Dec. 30, 1947 |
| 2,623,542 | Obermaier | Dec. 30, 1952 |
| 2,638,929 | Delany et al. | May 19, 1953 |
| 2,844,352 | Dahl | July 22, 1958 |
| 2,918,087 | Curran | Dec. 22, 1959 |